(12) United States Patent
Murakami et al.

(10) Patent No.: US 9,001,156 B2
(45) Date of Patent: Apr. 7, 2015

(54) INFORMATION-PROCESSING DEVICE AND PROGRAM

(75) Inventors: Keiichi Murakami, Tokyo (JP); Yasushi Onda, Tokyo (JP); Dai Kamiya, Tokyo (JP); Izua Kano, Tokyo (JP); Kazuhiro Yamada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 975 days.

(21) Appl. No.: 13/061,741

(22) PCT Filed: Sep. 8, 2009

(86) PCT No.: PCT/JP2009/065675
§ 371 (c)(1),
(2), (4) Date: Mar. 2, 2011

(87) PCT Pub. No.: WO2010/027085
PCT Pub. Date: Mar. 11, 2010

(65) Prior Publication Data
US 2011/0164054 A1    Jul. 7, 2011

(30) Foreign Application Priority Data

Sep. 8, 2008 (JP) ................................. 2008-230220

(51) Int. Cl.
*G09G 5/00* (2006.01)
*G06F 3/0481* (2013.01)
*G09G 5/14* (2006.01)
*H04M 1/725* (2006.01)

(52) U.S. Cl.
CPC ................ *G06F 3/0481* (2013.01); *G09G 5/14* (2013.01); *G09G 2340/0464* (2013.01); *H04M 1/72583* (2013.01)

(58) Field of Classification Search
CPC ..................... G06F 3/0481; G09G 2340/0464; G09G 5/14; H04M 1/72583
See application file for complete search history.

(56) References Cited

U.S. PATENT DOCUMENTS

2007/0265930 A1* 11/2007 Mohr .............................. 705/26

FOREIGN PATENT DOCUMENTS

| EP | 1850278 A1 | 10/2007 |
| JP | 08-328531 | 12/1996 |
| JP | 09-258971 | 10/1997 |

(Continued)

OTHER PUBLICATIONS

First Notification of Office Action issued in Chinese Patent Application No. 200980134604.2 issued on Aug. 30, 2012.

(Continued)

*Primary Examiner* — Kee M Tung
*Assistant Examiner* — Frank Chen
(74) *Attorney, Agent, or Firm* — MGK, LLC

(57) ABSTRACT

An information-processing device comprises: a display control that controls display positions of first and second information images in a display area of a display means for displaying an image, instructions are received for causing the first information image to move in a given direction. A display control executes a first process that, during a period in which the instruction is received, causes the first information image to move and a second process that, in a case where the first information image comes into contact with the second information image as a result of the movement caused by the first process and is further moved after the contact, causes the second information image to move in a direction different from the direction of movement of the first information image, such that the second information image does not overlap the first information image.

6 Claims, 6 Drawing Sheets

(56) References Cited

FOREIGN PATENT DOCUMENTS

| | | |
|---|---|---|
| JP | 2000-020207 A | 10/2000 |
| JP | 2003-066941 | 3/2003 |
| JP | 2003-186593 | 7/2003 |
| JP | 2006-195512 | 7/2006 |

OTHER PUBLICATIONS

European Supplementary Search Report issued in EP09811608.0-1959/2328072, dated Mar. 21, 2014.
European Communication pursuant to Article 94(3) EPC, issued in EP09811608.0-1959, dated Apr. 8, 2014.

* cited by examiner (a)

(b)

(c)

(d)

(e)

(a)

(b)

(c)

(a)

(b)

INFORMATION-PROCESSING DEVICE AND PROGRAM

TECHNICAL FIELD

The present invention relates to a GUI (Graphical User Interface).

BACKGROUND

There are cases in which images, such as windows, are displayed side-by-side in a display area. In such cases, each window may be moved. It is desirable that windows be displayed so as not to overlap one another, whereby each window can be viewed without obstruction.

As a technique for moving windows while ensuring that each window can be viewed without obstruction, it is known, for example, that when a window is caused to move towards another displayed window, both of the windows are caused to move.

However, since the display area is limited, mere movement of plural windows in the same direction may not result in a desired operation when a window is at a boundary of the display area. Also, although it may be possible to place plural windows at respective desired positions by manipulating each window, such manipulation of each window is inconvenient.

In view of the foregoing, an object of the present invention is, when one image (such as a window) is moved to a position including an area in which another image is displayed, to move plural images such that each image can be viewed without obstruction, without any necessity for manipulation of the other image.

SUMMARY

An image-processing device according to one aspect of the present invention includes a display control means that controls display positions of first and second information images in a display area of a display means for displaying an image; and a reception means that receives an instruction for causing the first information image to move in a given direction of movement, wherein the display control means executes: a first process that, during a period in which the instruction is received by the reception means, causes the first information image to move in the direction of movement indicated by the instruction; and a second process that, in a case where the first information image comes into contact with the second information image as a result of the movement caused by the first process and is further moved a predetermined amount in the direction of movement after the contact, causes the second information image to move in a direction different from the direction of movement of the first information image, such that the second information image does not overlap the first information image.

In the image-processing device according to one aspect of the present invention, the display control means may be configured such that, in the second process, the display control means causes the second information image that is displayed on a side in the direction of movement relative to the first information image to move such that the second information image is displayed on a side opposite to the direction of movement relative to the first information image.

Alternatively, the display control means may be configured such that, in the second process, the display control means causes the second information image to move in a direction perpendicular to the direction of movement.

In the image-processing device according to one aspect of the present invention, the display control means may be configured such that, in the first process, the display control means decreases a speed of movement of the first information image in the direction of movement during the period in which the instruction is received by the reception means, as the first information image approaches the second information image.

In the image-processing device according to one aspect of the present invention, the display control means may be configured such that, in the second process, upon contact of the first information image with the second information image, the display control means causes each of the first information image and the second information image to move in the direction of movement, and when the first information image is further moved a predetermined amount after the second information image has reached a predetermined position, the display control means causes the second information image to move in a direction different from the direction of movement.

In the image-processing device according to one aspect of the present invention, the display control means may be configured such that when, after the contact of the first information image with the second information image, the first information image has not been moved the predetermined amount in the direction of movement for a predetermined period of time, the display control means executes a third process that causes the first information image to move in a direction opposite to the direction of movement.

Also, a program according to another aspect of the present invention is characterized in that the program causes a computer to execute the above-stated processes, that is, to cause the computer to function as the above-stated information-processing device. This program according to another aspect of the present invention may be downloaded to a computer via a network such as the Internet, to be installed for use in the computer. A storage medium according to yet another aspect of the present invention is a storage medium, such as an optical disk, on which the foregoing program is stored.

According to the present invention, when one image is moved to a position including an area in which another image is displayed, this other image is moved to a position where it does not overlap the one image, and thus, it is possible to move plural images such that each image can be viewed without obstruction, without any necessity for manipulation of the other image.

DETAILED DESCRIPTION

Figure 1:
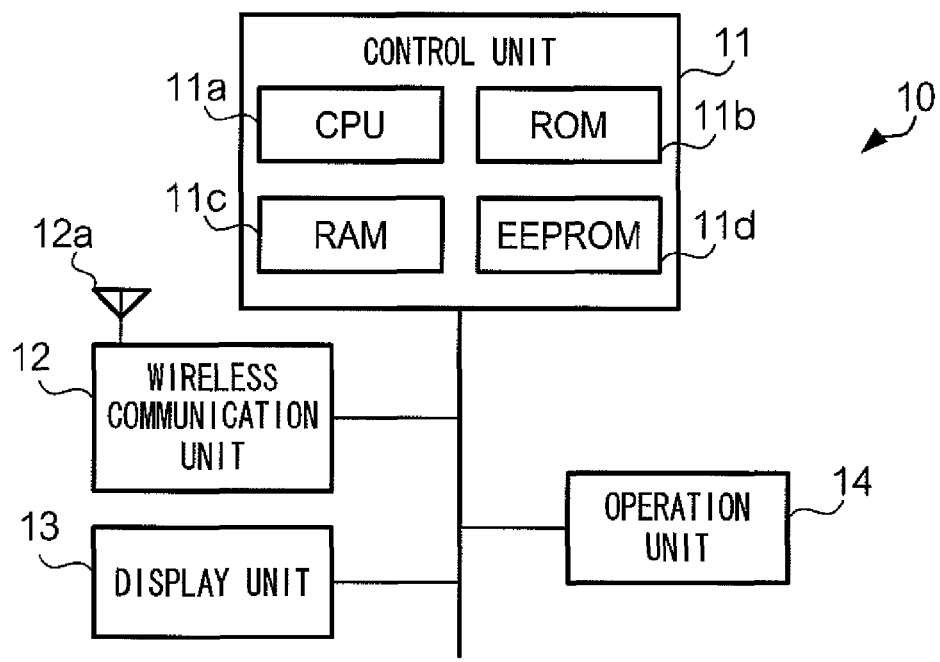
FIG. 1 is a block diagram showing a physical configuration of a communication terminal device.

FIG. 1 is a block diagram showing a physical configuration of a communication terminal device according to an embodiment of the present invention. As shown in this drawing, communication terminal device 10 includes control unit 11, wireless communication unit 12, display unit 13, and operation unit 14. It is to be noted that communication terminal device 10 according to the present embodiment is a mobile phone having a means for inputting and outputting a voice (not shown) such as a microphone and a speaker.

Control unit 11 includes CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, so that control unit 11 controls an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys (operation elements), and provides operation information to control unit 11, which corresponds to a key-pressing operation by a user. The keys of operation unit 14 include a key for instructing a direction of movement of a window (hereinafter referred to as a "direction key"). By operating the direction key, a user is able to move a window to a desired position. In this embodiment, the direction key is a so-called cross key, by which one of four directions of left, right, up, and down is selected as a direction of movement; however, the direction key may be a key whereby a direction other than the four directions, such as an oblique direction (toward upper right or lower left, for example) may be selected. It is also to be noted that the keys may be so-called hard buttons or may be a touch sensor overlaid on the liquid crystal display.

Display unit 13 in the present embodiment has a rectangular display area. The rectangle has shorter sides extending in a horizontal direction, and longer sides extending in a vertical direction. In the following description, an orthogonal coordinate is defined with respect to the display area, such that the X-axis extends in the horizontal direction and the Y-axis extends in the vertical direction. The origin of the coordinate system can be set arbitrarily.

ROM 11b pre-stores some programs. Hereinafter, the programs will be referred to as "preinstalled programs." The preinstalled programs include a multitask operating system (hereinafter referred to as "multi-task OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 140 (described later) in communication terminal device 10 in which the multitask OS is installed. The native applications are programs for realizing a basic function of communication terminal device 10 such as a telephone call.

EEPROM 11d includes Java application storage areas for storing Java applications. A Java application includes a JAR (Java Archive) file that is a combination of a substance program that describes a procedure in a Java Runtime Environment, and image files, audio files, and so on that are used when the substance program is executed; and an ADF (Application Descriptor File) in which properties of installation, start-up, and so on of the JAR file are described. The Java application is prepared by a content provider or a telecommunications carrier, and stored in an external server device or the like. Java applications are downloaded from such server devices on request by communication terminal device 10.

Figure 2:
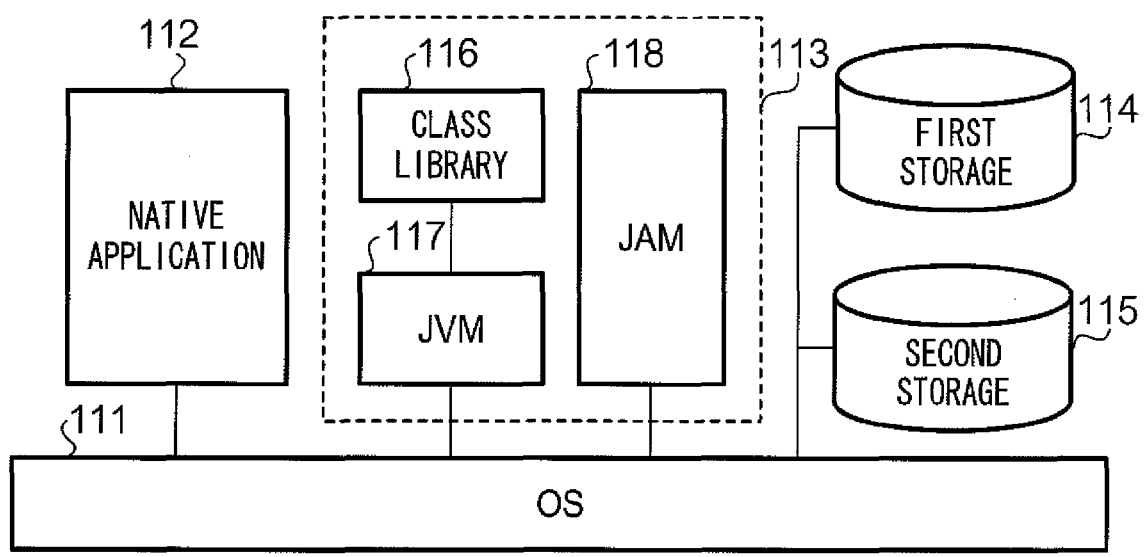
FIG. 2 is a diagram showing a logical configuration of a communication terminal device.

FIG. 2 is a diagram showing a logical configuration realized by control unit 11 of communication terminal device 10 by executing programs stored in ROM 11b and EEPROM 11d. As shown in this drawing, in communication terminal device 10 that executes the programs, native application 112 and Java Runtime Environment 113 are realized in OS 111, and first storage 114 and second storage 115 are secured in EEPROM 11d.

Java Runtime Environment 113 is realized by use of the Java platform stored in ROM 11b. Java Runtime environment 113 includes class library 116, JVM (Java Virtual Machine) 117, and JAM (Java Application Manager) 118. Class library 116 is a file of a combination of program modules (classes) that have a particular function. JVM 117 is a Java Runtime Environment that is optimized for the CDC described above, and has a function of interpreting and executing bytecodes provided as a Java application. JAM 118 has a function of managing downloading, installation, start-up, termination, and so on of Java applications.

First storage 114 is an area for storing Java applications (JAR files and ADFs), which are downloaded under control of JAM 118. Second storage 115 is an area in which an individual storage area is assigned to each installed Java application, and is used for storing data generated during running of Java applications after the applications are terminated. The data in a storage area assigned to a certain Java application can be rewritten only when the application is running; therefore, the data cannot be rewritten by another Java application.

Java applications of the present embodiment include applications for displaying plural windows. The Java applications for displaying plural windows include a "window display application" and a "widget." The window display application is an application for displaying one or more windows in a display area of display unit 13, and controlling a display aspect of the one or more windows. The "widget" is an application that realizes a predetermined function on the condition that the window display application displays a window. The window display application in the present embodiment controls the display such that plural windows do not overlap one another, except in a specific case described below.

A "window" of the present embodiment refers to an image displayed in a part of a display area of display unit 13 that is assigned to a widget, and is displayed as an image that can be distinguished from an image in another part of the display area. The window displays certain information, and is an example of an "information image" of the present invention. In this example, the shape and size (area) of the window are determined depending on a widget; however, the shape and size of the window may be changed. Also, the window may be moved in accordance with an operation by a user.

In the present embodiment, communication terminal device 10 executes plural widgets each realizing a different function. The widgets include, for example, a widget for displaying a time and date by displaying a clock image in a window, a widget for displaying characters or the like input by a user in a window as a memorandum, a widget for playing a video or music, and so on. Also, the widgets may include a widget that obtains information such as news or weather forecast via wireless communication unit 12 at appropriate timings, and displays images according to the obtained information.

The foregoing is a description of the configuration of communication terminal device 10. With the configuration, communication terminal device 10 executes plural applications in accordance with a request by a user. Communication terminal device 10 according to the present embodiment realizes a so-called multi-window system by displaying windows of widgets. Namely, communication terminal device 10 runs a window display application when displaying plural windows. In a state where plural windows are displayed, a user is able to select one from among the plural windows by performing a predetermined operation. In the following description, a window that is selected will be referred to as "selected window," and a window that is not selected will be referred to as "non-selected window" for convenience of explanation. The selected window is an example of a "first information image" of the present invention, while the non-selected window is an example of a "second information image" of the present invention. It is to be noted that in the present embodiment "selection" of a window means making the window the focus of an input operation or making the window active.

In a state where a selected window is selected by a user, upon receipt of an instruction indicating a direction of movement input via the direction key, communication terminal device 10 causes the selected window to move in the indicated direction. Thus, communication terminal device 10 is capable of moving the selected window in a direction of movement according to an operation of the direction key. In this example, an amount of movement of the selected window is determined such that each single pressing operation of the direction key causes the window to move by a predetermined amount (e.g., an amount corresponding to one pixel in the display area). It is also possible that, when the direction key is pressed continuously for the same direction of movement, the same processing is performed as that when the direction key is pressed plural times. In another example, if the direction key is pressed plural times within a predetermined period of time, an amount of movement per single pressing operation may be caused to increase as the number of pressing operations increases. In this way, a user can perceive that the movement of the selected window is accelerating, and achieve the desired movement of the window more quickly.

Figure 3:
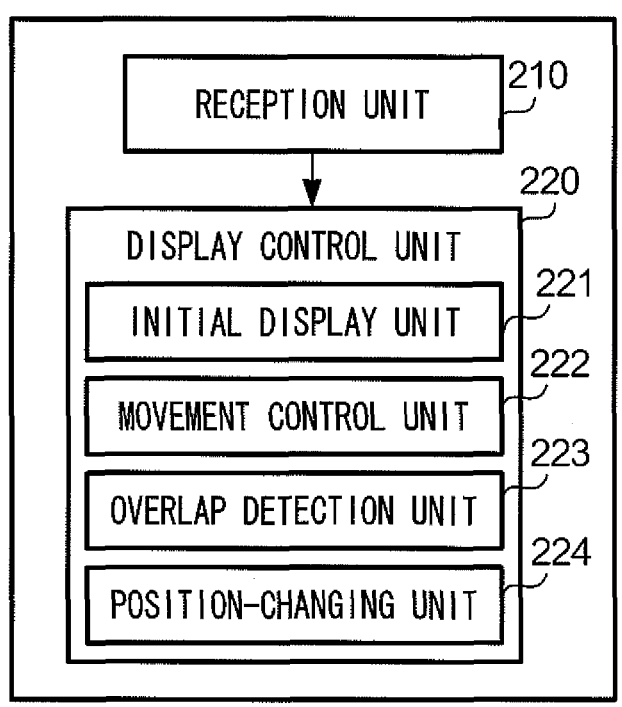
FIG. 3 is a functional block diagram showing functions realized by a communication terminal device.

FIG. 3 is a functional block diagram showing functions realized by control unit 11 of communication terminal device 10 when plural windows are displayed. As shown in this drawing, control unit 11 of communication terminal device 10 executes the stored programs to realize the functions corresponding to reception unit 210 and display control unit 220. More specifically, display control unit 220 includes initial display unit 221, movement control unit 222, overlap detection unit 223, and position-changing unit 224.

Reception unit 210 has a function of receiving instructions relating to display of windows. In the present embodiment, the instructions received by reception unit 210 include the following three types: an instruction for displaying or hiding a window; an instruction for selecting a window; and an instruction for moving a selected window. More specifically, in the present embodiment, the instruction for moving a selected window causes the window to move in one of four directions. Reception unit 210 identifies these instructions based on the operation information provided from operation unit 14. Display control unit 220 has a function of controlling the display on display unit 13. Display control unit 220 causes the display position of a window to change in accordance with the instruction identified by reception unit 210.

Initial display unit 221 causes plural windows to be displayed such that the windows do not overlap one another. Initial display unit 221 may pre-store display positions of the plural windows, or may calculate such positions that do not cause the windows to overlap. It is to be noted that a number of windows displayed by initial display unit 221 may increase or decrease during display. Initial display unit 221 selects one of the displayed windows as a selected window, while the other windows are unselected. It is preferred that initial display unit 221 display the windows in such a manner that a user can distinguish the selected window from the non-selected windows.

Movement control unit 222 controls movement of the selected window in response to an instruction for moving the selected window. Movement control unit 222 determines a direction of movement and a speed of movement of the selected window, and causes the window to move in accordance with the determined direction and speed. In determining the speed of movement of the selected window, movement control unit 222 may take into account a distance between the selected window and a non-selected window, as will be described later as a modified embodiment. In the present embodiment, the speed of movement of the selected window is determined based on the above-stated amount of movement. In this example, movement control unit 222 performs processing of causing a window to move during a period in which an instruction is received by reception unit 222, such that the window is moved in a direction of movement in accordance with the received instruction. It is to be noted here that the "period in which an instruction is received" indicates a period in which a key of operation unit 14 is pressed continuously. It may be determined that the "period in which an instruction is received" is continuous when a key of operation unit 14 is released and is pressed again within a predetermined threshold time period after the key was previously pressed.

Overlap detection unit 223 detects an amount of overlap between a selected window and a non-selected window when the selected window is caused to move to contact with and then overlap the non-selected window. In the following description, an amount of overlap between the selected window and the non-selected window will be referred to as an "overlap amount." The overlap amount may be an area of overlap between the selected window and the non-selected window or a (maximum) width of overlap between the selected window and the non-selected window in the direction of movement. It is to be noted that in the present embodiment, "overlapping" indicates a state where at least a part of a display area of one window is shared by a display area of another window. A state in which windows overlap one another typically is a state in which viewing of one of the windows is obstructed.

Position-changing unit 224 changes a display position of the non-selected window overlapping with the selected window, in a case where the overlap amount detected by overlap detection unit 223 has reached a threshold value. When changing the display position of the non-selected window, position-changing unit 224 may change a display position of the selected window as well. That is, position-changing unit 224 causes the non-selected window overlapping the selected window to move, and in some cases, causes the selected window to move as well. Position-changing unit 224 stores the threshold value.

Figure 4:
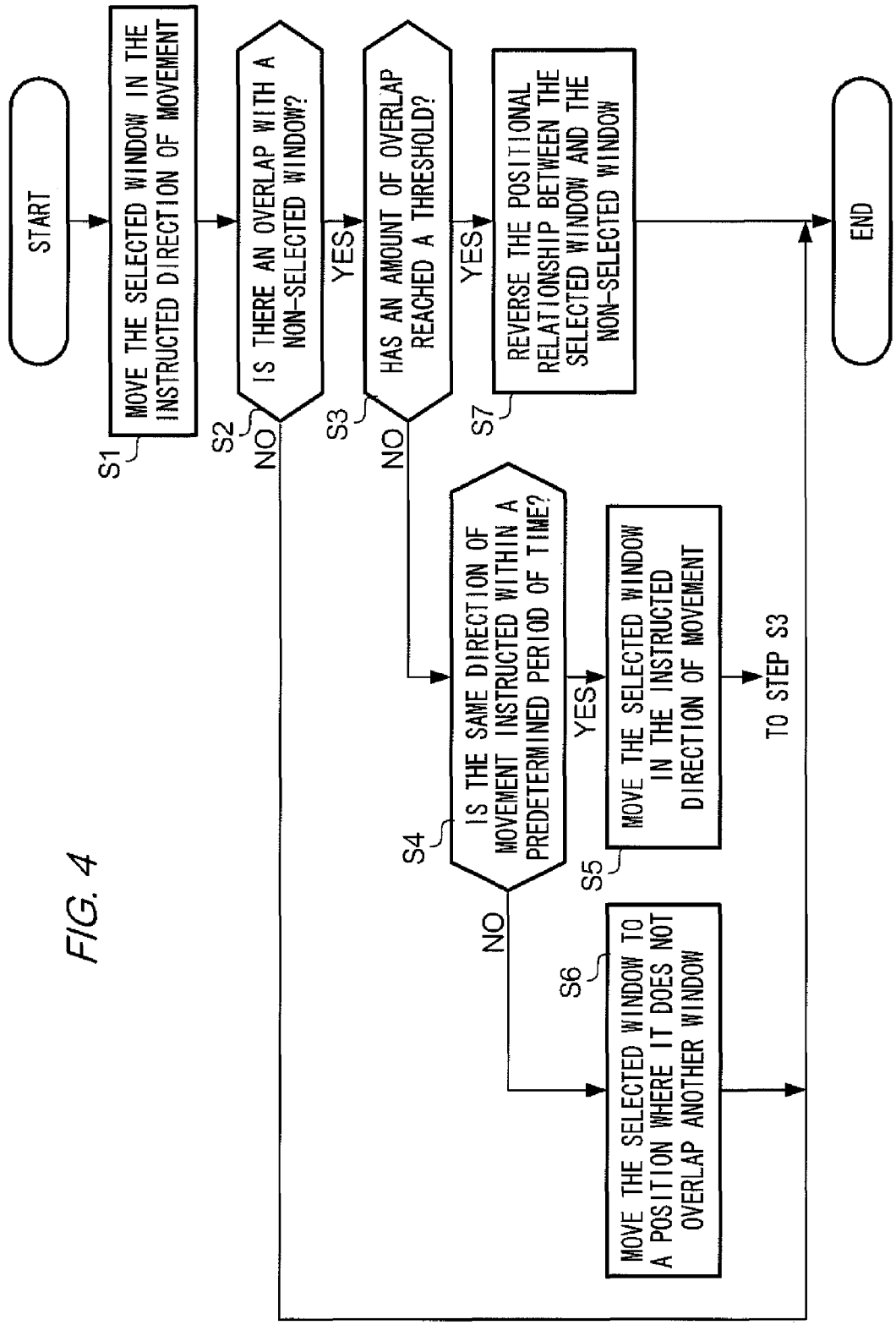
FIG. 4 is a flowchart showing a display control process.

FIG. 4 is a flowchart showing a display control process conducted by display control unit 220. The display control process shown in this drawing is a process conducted in response to a user's instruction for moving a selected window when plural windows including the selected window are displayed. Therefore, this display control process is performed after display by initial display unit 221 has been carried out.

In the display control process shown in FIG. 4, first, display control unit 220 causes the selected window to move in a direction of movement instructed (step S1). Subsequently, display control unit 220 determines whether the selected window overlaps any of the plural non-selected windows (step S2). If the selected window does not overlap any of the non-selected windows, display control unit 220 terminates the process. When a new direction of movement is instructed, display control unit 220 repeats this process.

If it is determined that the selected window overlaps any of the non-selected windows, display control unit 220 determines whether the overlap amount has reached a threshold value (step S3). It is to be noted here that the "threshold value" for the overlap amount may be a predetermined value or a value determined depending on the size of the overlapping window. For example, the threshold value may be set to be 50% of the display area of the non-selected window. In such a case, display control unit 220 determines that the overlap amount has reached the threshold value when 50% of the display area of the non-selected window overlaps the display area of the selected window.

If it is determined that the overlap amount has not reached the threshold value, display control unit 220 determines whether the same direction of movement as that instructed immediately before is instructed within a predetermined period of time (step S4). If such an instruction is input, display control unit 220 causes the selected window to move in the instructed direction of movement (step S5), and repeats the above-described process, starting from step S3. On the other hand, if the same direction of movement is not instructed within the predetermined period of time, display control unit 220 causes the selected window to move to a position where the selected window does not overlap another window (step S6), and terminates the process.

For example, the process in step S6 is a process of causing the selected window to move in a direction opposite to the direction of movement until that point, to bring the display position of the selected window back to that before the movement. However, the direction of movement in the process of step S6 is not limited to the direction opposite to the direction of movement until that point, so long as the selected window is moved to a position where the selected window does not overlap another window.

If it is determined that the overlap amount has reached the threshold value, display control unit 220 performs a reversal of the positional relationship between the selected window and the non-selected window having an overlapping portion (step S7), and terminates the process. The process performed in step S7 will be referred to as a "position reversal process" in the following description.

Figure 5:
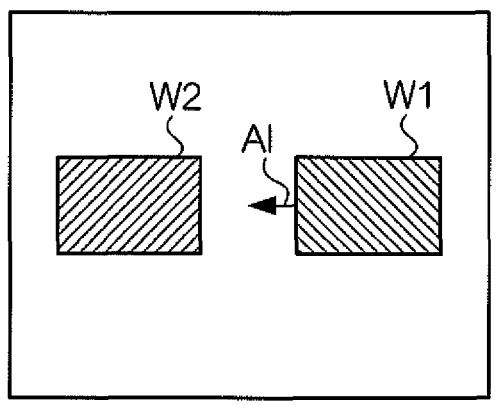
FIG. 5 is a diagram for explaining a position reversal process.
Figure 5:
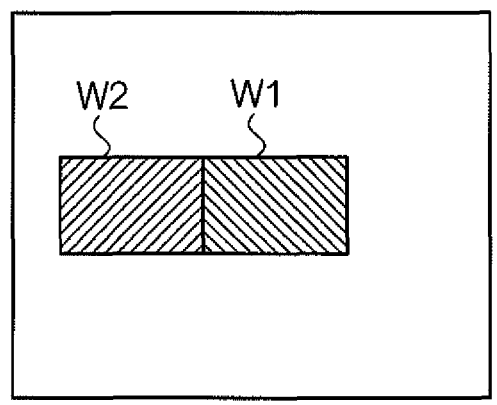
Figure 5:
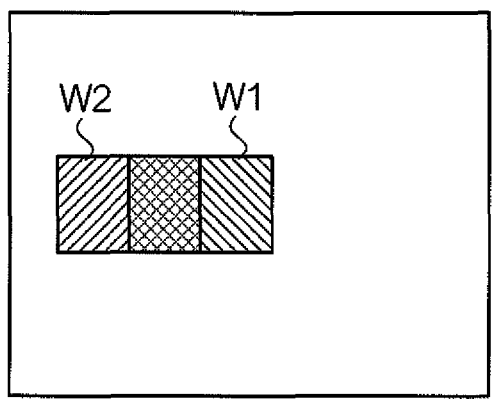
Figure 5:
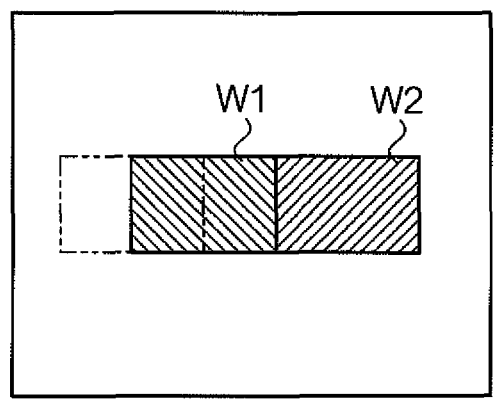
Figure 5:
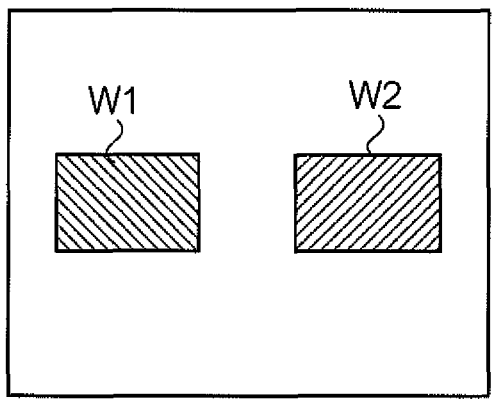

FIG. 5 is a diagram for explaining the position reversal process. In this drawing is shown an example in which the direction of movement is a leftward direction, as indicated by arrow A1 in the drawing, the selected window is W1, and the non-selected window is W2. Before the selected window is moved, selected window W1 and non-selected window W2 do not overlap each other, as is shown in FIG. 5(*a*). In this state, when selected window W1 is caused to move in the leftward direction, selected window W1 comes into contact with non-selected window W2, as shown in FIG. 5 (*b*). Then, when selected window W1 is further moved in the leftward direction, selected window W1 and non-selected window W2 come to overlap each other. In this example, a state in which selected window W1 and non-selected window W2 contact each other may include, in addition to a state in which an end pixel of selected window W1 and an end pixel of non-selected window W2 are adjacent to each other, a state in which a predetermined number of pixels as a margin is interposed between the end pixel of selected window W1 and the end pixel of non-selected window W2.

FIG. 5(*c*) is a diagram showing selected window W1 and non-selected window W2 when the overlap amount has reached the threshold value. In this drawing, an overlapping area between selected window W1 and non-selected window W2 is an area in which hatchings of respective windows overlap each other. When selected window W1 has been moved to a position shown in FIG. 5(*c*), display control unit 220 causes non-selected window W2, which is displayed generally in the direction of movement relative to selected window W1, to move such that non-selected window W2 is displayed generally in a direction opposite to the direction of movement relative to selected window W1. In this process, display control unit 220 may display non-selected window W2 on the right side of selected window W1 without changing the display position of selected window W1 from that shown in FIG. 5(*c*). Alternatively, as shown in FIG. 5(*e*), display control unit 220 may change the display position of selected window W1 to the display position of non-selected window W2 in FIG. 5(*a*), while changing the display position of non-selected window W2 to the display position of selected window W1 in FIG. 5(*a*). Thus, in the "reversal process" according to the present embodiment, a concrete display position of each window may be arbitrary, so long as the positional relationship between the selected window and the non-selected window overlapping each other is reversed with respect to the direction of movement.

As is described in the foregoing, when movement of a selected window is instructed continuously and an amount of overlap with a non-selected window has reached a threshold value, communication terminal device 10 reverses the positional relationship between the selected window and the non-selected window. Thus, in this communication terminal device 10, in cases where it is desired that the selected window be moved to a boundary of the display area of display unit 13 or its neighborhood, it is avoided that the non-selected window is moved to an outside of the boundary or that the selected window and the non-selected window are displayed in an overlapping manner. Therefore, it is possible to display the selected window at a desired position while it is ensured that the selected window and the non-selected window are viewed without obstruction. Further, in communication terminal device 10 according to the present embodiment, it is possible to move a non-selected window without inputting an instruction for moving the non-selected window. Therefore, it is not necessary for a user to instruct movement of each of the selected window and the non-selected window.

In a case where the display position of a selected window and the display position of a non-selected window are reversed, the possibility that each window obstructs viewing of the other window after the reversal is lower than in a case where such reversal is not performed. This is because the new display position of the selected window includes an area in which the non-selected window was previously displayed, and the new display position of the non-selected window includes an area in which the selected window was previously displayed. Thus, in communication terminal device 10 according to the present embodiment, it is possible, by a simple process, to move a window while displaying plural windows such that they do not overlap one another.

Further, in communication terminal device 10, when a period of time predetermined by a program or a parameter has lapsed in a state in which the selected window and the non-selected window are displayed with an overlapping portion, the selected window is moved to a position where the selected window does not overlap another window. Thus, in communication terminal device 10, even when the instruction for moving the selected window is not continued for long enough to cause reversal of the positions, it is possible to enable an unobstructed view of each window.

The present invention may be carried out in an embodiment other than the above embodiment. For example, the present invention may be carried out in the embodiments described below. It is to be noted that two or more of the following modifications may be used in combination.

In the present invention, a display aspect of each of a selected window and a non-selected window after these windows come into contact with each other is not limited to representing overlap of these windows. For example, when a selected window and a non-selected window come into contact with each other, a displayed shape of the non-selected window may be deformed to have a smaller width or height as if a part of the non-selected window on a side on which the selected window comes into contact is compressed in the direction of movement. In such a case, the display position of a side of the non-selected window opposite to the side on which the selected window comes into contact may remain unchanged. Further, the deformation may take place in the selected window instead of the non-selected window, or may take place in each of these windows.

In this modification, an amount of window deformation may be used in place of the above-described "overlap amount." That is, according to this modification, display control unit 220 performs the above-described position reversal process when the amount of window deformation has reached a threshold value. Further, instead of the amount of window deformation, it is possible to use a distance of movement instructed by a user during a time the deformation is being caused. Thus, a "predetermined amount" used in the present invention to determine whether a "second process" should be performed may be a single-dimensional concept that represents a distance in a direction of movement or a two-dimensional concept that represents an amount of overlap or an area of deformation.

In the present invention, the direction of movement of a non-selected window that overlaps a selected window is not limited to a direction opposite to the direction of movement of the selected window. In the present invention, the direction of movement of a non-selected window that overlaps a selected window may be a direction that intersects with the direction of movement of the selected window.

Figure 6:
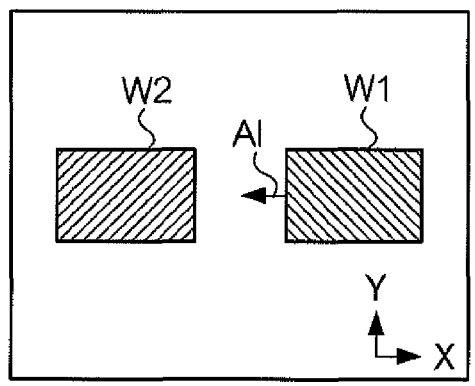
FIG. 6 is a diagram showing an exemplary direction of movement of a non-selected window that overlaps a selected window.
Figure 6:
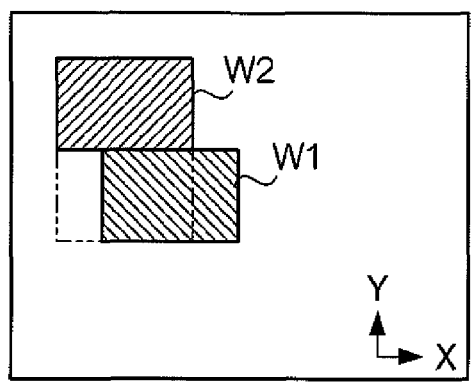
Figure 6:
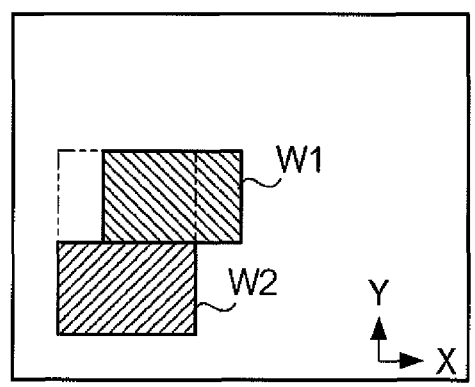

FIG. 6 is a diagram showing exemplarily a direction of movement of a non-selected window that overlaps a selected window. FIG. 6 shows an example in which the direction of movement of a non-selected window that overlaps a selected window is a direction perpendicular to the direction of movement of the selected window. In a case where selected window W1 and non-selected window W2 are displayed as shown in FIG. 6(a), for example, upon movement of selected window W1 in the leftward direction, i.e., in the direction indicated by arrow A1 in the drawing, display control unit 220 may cause movement as shown in FIG. 6(b) or FIG. 6(c), instead of the position reversal process described in the foregoing. It is to be noted here that the direction indicated by arrow A1 is a direction parallel to the X-axis (leftward direction), and the direction of movement of non-selected window W2 is a direction parallel to the y-axis (upward direction or downward direction). It is also to be noted that the long- and double-short dashed line in this drawing represents the display position of non-selected window W2 before the movement.

Figure 7:
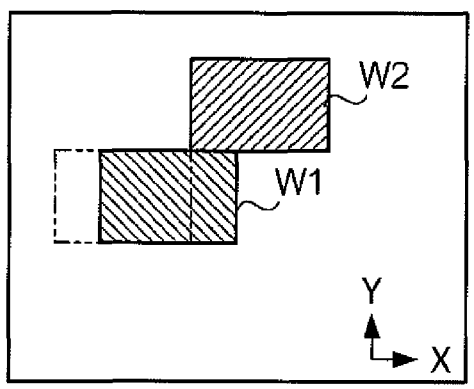
FIG. 7 is a diagram showing an exemplary direction of movement of a non-selected window that overlaps a selected window.
Figure 7:
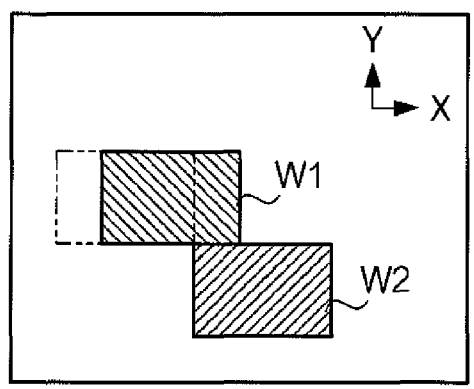

Further, the direction of movement of a non-selected window that overlaps a selected window may be any direction away from a direction perpendicular to the direction of movement of the selected window in a direction opposite to the direction of movement of the selected window. For instance, instead of the example shown in FIG. 6(b) or FIG. 6(c), an upper right direction or a lower right direction, as shown in FIG. 7(a) or FIG. 7(b), may be adopted as the direction of movement of a non-selected window.

In the present invention, it may be sufficient if the direction of movement of a non-selected window that overlaps a selected window is different from the direction of movement of the selected window. However, it is preferred that the direction of movement of the non-selected window be either a direction perpendicular to the direction of movement of the selected window or a direction generally opposite to the direction of movement of the selected window. It is to be noted here that the "direction generally opposite to the direction of movement of the selected window" is any direction away from a direction perpendicular to the direction of movement of the selected window in a direction opposite to the direction of movement of the selected window. In a case where the direction of movement of a non-selected window is either of the above-stated directions, even when there is a boundary of display area in the direction of movement of a selected window, it is possible to move the selected window to a position close to the boundary while moving the non-selected window to a position where the non-selected window does not obstruct viewing of the selected window.

As is described in the foregoing, movement control unit 222 may use a distance between a selected window and a non-selected window to determine a speed of movement of the selected window. The "distance" here may be a length of a straight line connecting a center of the selected window with a center of the non-selected window, or the shortest one of straight lines each connecting an arbitrary position in an area in which the selected window is displayed with an arbitrary position in an area in which the non-selected window is displayed.

Movement control unit 222 may decrease the speed of movement of the selected window as the selected window approaches the non-selected window. For example, movement control unit 222 may calculate a distance between the selected window and the non-selected window, and decrease the speed of movement as the calculated distance becomes smaller. However, when it is possible to reverse the display positions of the selected window and the non-selected window, movement control unit 222 avoids a state in which the speed of movement becomes equal to or less than zero, i.e., a state in which, despite an instruction from a user on the direction of movement, the selected window does not move in the instructed direction of movement. Movement control unit 222 may start the control of the speed of movement from when the selected window and the non-selected window come to overlap each other, or from when the distance between the selected window and the non-selected window becomes equal to or lower than a predetermined threshold value. Further, it is preferred that movement control unit 222 continue the control of the speed of movement until the overlap amount reaches a threshold value.

By use of such control, it is possible, when the display position of the selected window is different to that of the non-selected window, to give a user an operational sense that is different from that given in a case where such control is not adopted. According to this example, when a user moves the selected window toward the non-selected window, the user may sense that a force resisting the user's instruction is generated, and if the user inputs instructions to overcome the resisting force, the selected window can be moved to a desired position.

With such an operational sense, the user may prevent an undesired operation from being executed. For example, in a case where a non-selected window is displayed and the user does not want to change the position of the non-selected window, if the user conducts an operation that causes a selected window to move toward the non-selected window, the user will sense that a force resisting the user's instruction is generated, and this can draw to the user's attention that the display position of the non-selected window may be moved. If the user does not want the non-selected window to be moved, s/he can prevent communication terminal device 10 from carrying out the undesired operation by stopping the movement of the selected window.

According to the present invention, when a selected window comes into contact with a non-selected window, these windows may be caused to move unitarily in a direction of movement instructed by a user before the non-selected window is moved in a direction different from the direction of movement of the selected window. It is to be noted, however, that such a unitary movement is allowed only when there is nothing in the direction of movement that would obstruct the movement. Therefore, for example, in cases where there is a boundary of the display area in the direction of movement, or when there is an image displayed in the direction of movement for which obstruction of viewing is undesirable, the selected window and the non-selected window may be caused to move unitarily until the non-selected window comes into contact with the boundary or the image, and thereafter, the same operation as that of the above embodiment may be performed. In these cases, movement control unit 222 stores a position of an element that would obstruct the movement of the window (a boundary of the display area, an image for which overlap by another image is prohibited, an image of which movement is prohibited, and so on), as a predetermined position. Movement control unit 222 causes the selected window and the non-selected window to move unitarily until the non-selected window comes into contact with the predetermined position, and after the non-selected window comes into contact with the predetermined position, performs the same operation as that of the above embodiment.

In the present invention, a window may have plural display aspects when the window is selected. In such a case, the plural display aspects may switch in stages in response to predetermined operations.

Figure 8:
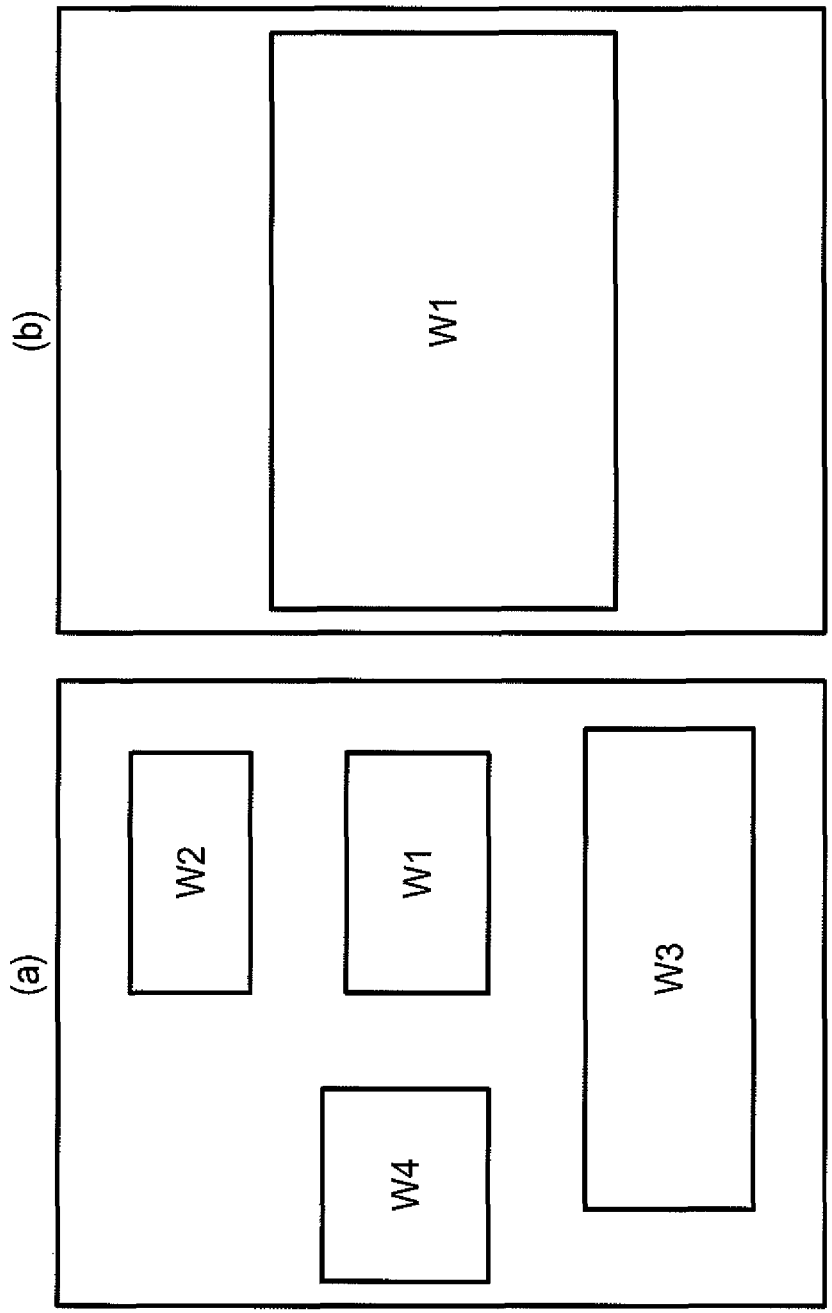
FIG. 8 is a diagram showing exemplary display aspects of a selected window.

FIG. 8 is a diagram showing exemplary display aspects of a selected window. FIG. 8(a) shows an example in which selected window W1 is displayed together with non-selected windows W2-W4, and FIG. 8(b) shows an example in which only selected window W1 is displayed in an enlarged state. For instance, when, in the display aspect shown in FIG. 8(a), each window is too small for a user to be able to visually recognize the displayed content, the display may be switched to an enlarged view as shown in FIG. 8(b).

Also, the display may be switched to the enlarged view shown in FIG. 8(b) when a predetermined operation is performed after the view shown in FIG. 8(a) is displayed. In such a case, the display aspect of a selected window has two stages: a stage shown in FIG. 8(a) and a stage shown in FIG. 8(b). In a case that the display aspect of a selected window has plural stages, a widget may be capable of performing different processes for respective stages of display of the selected window. For example, the clock widget described in the foregoing may function as follows: when the window is not selected, the time and date are displayed in a predetermined style; when the window is in the stage shown in FIG. 8(a), the time and date are displayed in a style of display different to that when the window is not selected; and when the window is in the stage shown in FIG. 8(b), a process for changing the time and date, appearance, and so on may be performed. The display when the window is not selected may contain only the time, and the display when the window is selected may contain the day of the week and the date in addition to the time.

A window in the present invention is not limited to a display area assigned to a "widget" as described in the above embodiment, and may be a display area assigned to another application (for example, a native application). Similarly, a widget is not limited to a Java application, and may be implemented as another application. Further, although in the above embodiment, plural windows are displayed as a result of execution of a window display application, which is a Java application, display of plural windows may be achieved by another application, such as an OS.

Further, a widget may obtain information via means other than wireless communication unit 12. For example, in a case where an information-processing device according to the present invention is equipped with an IC tag, a widget may obtain information stored in the IC tag. Also, in a case where an information-processing device according to the present invention has a locationing function such as that using a GPS (Global Positioning System) or the like, a widget may obtain position information (longitude, latitude, distance from a predetermined location, etc.) by using the locationing function.

An information image in the present invention may be any image that displays information, and is not limited to a window. An information image in the present invention may be an icon, for example. Further, an information image in the present invention may be a part of a window, instead of an entire window. For example, in a case where a window has a margin in which no information is displayed, if another window overlaps the margin, there is no information whose viewing is obstructed. Thus, an information image in the present invention may be a meaningful display area (an area in which information to be viewed by a user is displayed) of a window assigned to a widget, excluding the above-described margin and the like.

In the above embodiment, control unit 11 may be considered as corresponding to an information-processing device according to the present invention, or communication terminal device 10 may be considered as corresponding to the information-processing device. When communication terminal device 10 is considered to be serving as an information-processing device according to the present invention, a reception means is implemented as a combination of control unit 11 and operation unit 14. It is to be noted that an operation in the present invention can be input by means other than pressing of keys, such as speech recognition.

Further, in the above embodiment, the present invention is applied to a mobile phone. However, the present invention may be applied to another electronic device. The present invention may be applied to a variety of information-processing devices; namely, a communication terminal device such as a PDA (Personal Digital Assistance) or the like, a camera, a portable music player, a portable game player, and so on. Further, in the present invention, means for instructing a direction of movement is not limited to a key such as a cross key, but may be a pointing device such as a mouse or the like.

Furthermore, each of the functions performed in the above-described communication terminal device 10, which are shown in FIG. 3, may be implemented by a combination of programs, or may be implemented by cooperation of hardware resources. For example, an operation corresponding to reception unit 210 may be carried out by an OS, while an operation corresponding to display control unit 220 may be carried out by a window display application, so that respective functions are implemented by different programs. Alternatively, hardware resources carrying out these operations may be different from each other.

What is claimed is:

1. An information-processing device comprising:
   a display control means that controls display positions of first and second information images in a display area of a display means for displaying an image; and
   a reception means that receives an instruction for causing the first information image to move in a given direction of movement,
   wherein the display control means executes:
   a first process that, during a period in which the instruction is received by the reception means, causes the first information image to move in the direction of movement indicated by the instruction; and
   when the first information image comes into contact with the second information image as a result of the movement caused by the first process and is further moved a predetermined amount in the direction of movement after the contact between the first information image and the second information image, a second process is initiated by movement by the predetermined amount of the first information image and causes the second information image to move in a direction different from the direction of movement of the first information image, such that the second information image does not overlap the first information image,
   wherein in the first process, the display control means decreases a speed of movement of the first information image in the direction of movement during the period in which the instruction is received by the reception means such that the speed of movement of the first information is less than the speed of movement according to the instruction made by the reception means, as the first information image approaches the second information image.

2. The information-processing device according to claim 1, wherein in the second process, the display control means causes the second information image that is displayed on a side in the direction of movement relative to the first information image to move such that the second information image is displayed on a side opposite to the direction of movement relative to the first information image.

3. The information-processing device according to claim 1, wherein in the second process, the display control means causes the second information image to move in a direction perpendicular to the direction of movement.

4. The information-processing device according to claim 1, wherein in the second process, the display control means:
   upon contact of the first information image with the second information image, causes each of the first information image and the second information image to move in the direction of movement; and
   when the first information image is further moved a predetermined amount after the second information image has reached a predetermined position, causes the second information image to move in a direction different from the direction of movement.

5. The information-processing device according to claim 1, wherein when, after the contact of the first information image with the second information image, the first information image has not been moved the predetermined amount in the direction of movement for a predetermined period of time, the display control means executes a third process that causes the first information image to move in a direction opposite to the direction of movement.

6. A non-transitory computer-readable medium storing a program for causing a computer to execute a program for causing a computer including a display control means that controls display positions of first and second information images in a prescribed display area of display means for displaying an image, and a reception means that receives an instruction for causing the first information image to move in a given direction of movement, to execute:
   a first process that, during a period in which the instruction is received by the reception means, causes the first information image to move in the direction of movement indicated by the instruction; and
   when the first information image comes into contact with the second information image as a result of the movement caused by the first process and is further moved a predetermined amount in the direction of movement after the contact between the first information image and the second information image, a second process is initiated by movement by the predetermined amount of the first information image and, causes the second information image to move in a direction different from the direction of movement of the first information image, such that the second information image does not overlap the first information image,
   wherein in the first process, the display control means decreases a speed of movement of the first information image in the direction of movement during the period in which the instruction is received by the reception means such that the speed of movement of the first information is less than the speed of movement according to the instruction made by the reception means, as the first information image approaches the second information image.

* * * * *